June 19, 1945.   H. WESTERKAMP   2,378,611
METHOD OF SYNCHRONIZING THE PICTURE AND THE SOUND OF
INDEPENDENTLY ARRANGED PICTURE AND NEEDLE
SOUND REPRODUCTION DEVICES
Filed May 14, 1941
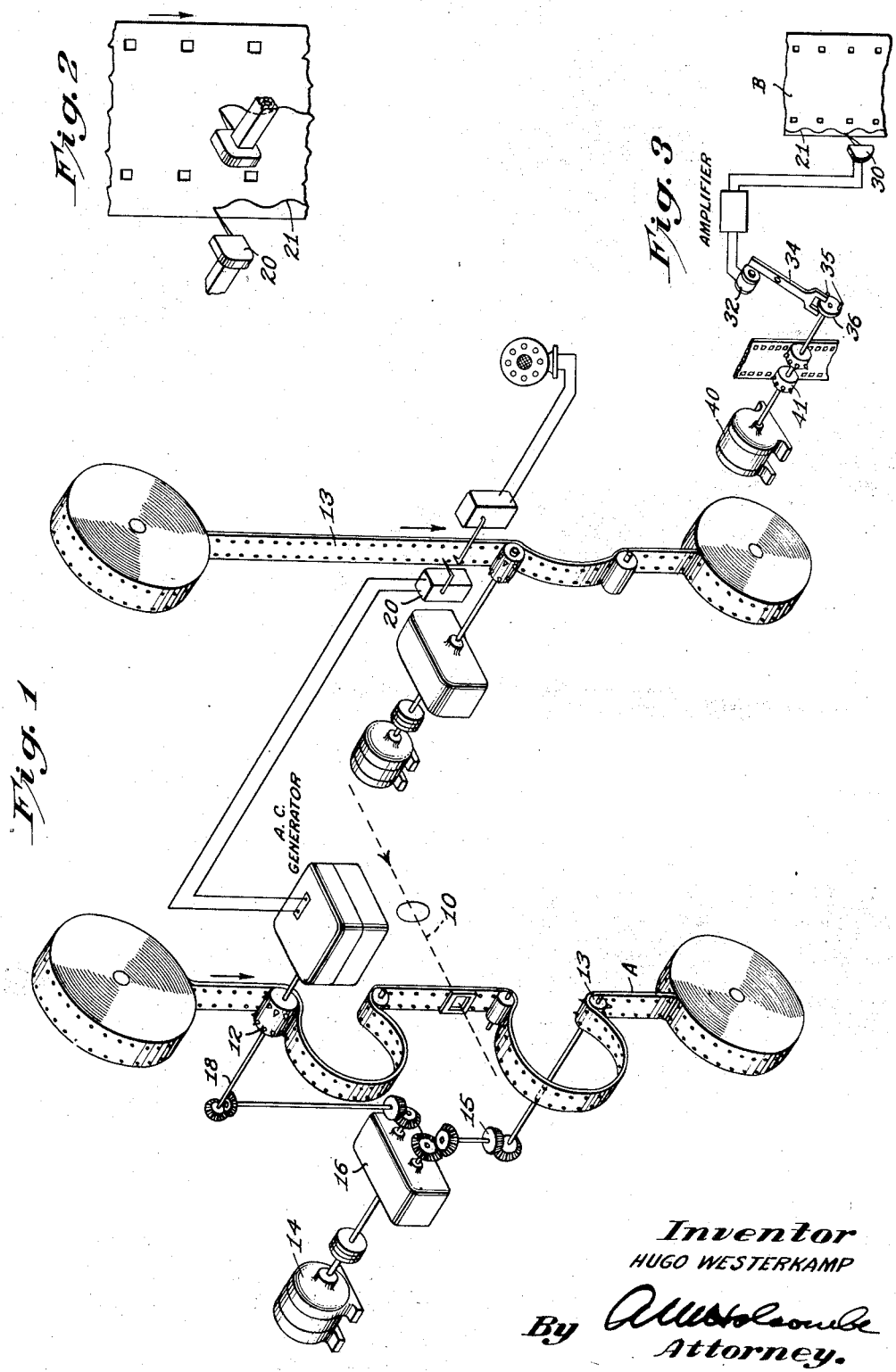
Inventor
HUGO WESTERKAMP
By Attorney.

Patented June 19, 1945

2,378,611

UNITED STATES PATENT OFFICE 2,378,611

METHOD OF SYNCHRONIZING THE PICTURES AND THE SOUND OF INDEPENDENTLY ARRANGED PICTURE- AND NEEDLE-SOUND-REPRODUCTION DEVICES

Hugo Westerkamp, Cologne-Poll, Germany; vested in the Alien Property Custodian

Application May 14, 1941, Serial No. 393,488
In Germany May 7, 1940

1 Claim. (Cl. 88—16.2)

The invention relates to a method of synchronizing the pictures and the sound of picture- and needle-sound-reproducing devices arranged independently of each other, and its object is to synchronize silent picture films by means of needle-sound-reproducing devices.

For this purpose it has been proposed to produce on the sound band of the needle-sound device a sine-shaped sound track of constant amplitude and frequency, and to use the voltage produced in following this track for the control of the synchronous running of the sound reproducing device. However, this proposal is based on the requirement that the picture-reproducing device itself as well as all other picture-reproducing devices run aboslutely synchronously. But actually such a synchronism cannot be attained in practice.

In order to obviate the difficulties arising in synchronizing silent picture films by means of needle-sound devices employing sound-record-films having mechanical recording tracks formed therein, the invention proposes to effect the control of the running of the picture reproducing device by means of a synchronizing impulse track which is provided on the sound band of the needle-sound device in or at the side of the sound track and which may be picked up mechanically, said impulses having been produced in recording the sound in dependence upon the switching motion of the picture reproducing device in advancing the picture films from frame to frame.

This recording of the control impulses on the sound band of the needle-sound device is effected according to the invention by utilizing the switching motion of the picture-reproducing device for producing impulses of a sine-shaped or not sine-shaped nature, and by recording these impulses on the sound band of the needle-sound device, in a manner known per se, like a sound record, which may be picked up mechanically, either in or at the side of the actual sound track, as mentioned above.

Another object of the invention is, in recording the impulse track serving to control the picture-reproducing device, to cut a maximum amplitude with the lowest possible voltage or to load as little as possible and, therefore, to preserve the impulse track during the reproduction. For this purpose the invention provides that, in case an impulse track is recorded at the side of the sound track, the oscillating system of the recording or reproducing element for the impulse track is given a natural frequency which is equal to or nearly equal to the frequency of the impulse track to be recorded or reproduced.

The method according to the invention may, for example, be carried out in the following manner. With the known types of picture-reproducing devices the motion of the gripper serving to feed the picture film or of any other arrangement serving to feed the picture film, for example of a maltese cross gear, is used to produce a sine-shaped or not sine-shaped oscillation of an electric, mechanical, or electromagnetic nature. Any desired means of a kind known per se may be employed for this purpose. The arrangement may be so that one impulse or a number of such impulses are produced with each picture switching. The oscillations or impulses produced are conducted to an electromagnetic sound recorder provided with a stylus which cuts, apart from the actual sound track, an impulse track so that the frequency of the impulses will exactly correspond to the frequency of the impulses produced by the switching motion of the picture film. Instead of cutting a special impulse track at the side of the actual sound track, the control impulses may be arranged in the actual sound track by conducting the impulses produced by the picture reproducing device directly to the normal sound recorder of the needle-sound device. In this case it is merely necessary to see that the frequency of the control impulses is below or above the range of audible frequencies of the sound record.

In the subsequent reproduction of a sound band with a record of this kind together with a picture reproducing device, the control impulses, after effecting any amplification of the voltage produced by them, are conducted to the picture reproducing device, where they are used either to control the running of the reproducing device or even for driving this device. For the amplification of the voltage produced in the pick-up any known kind of an arrangement may be used.

If, as mentioned above, in case of an impulse track recorded at the side of the sound track, the oscillating system of the element for picking up the impulse track is given a natural frequency, which is equal or nearly equal to the frequency of the impulse track to be reproduced, the pick-up needle will readily follow the impulse track practically without damping the oscillating system, so that the impulse track will be preserved as much as possible, since it is not loaded in any way. In equal manner it is advantageous if, in recording, the oscillating system of the recording element for the separately arranged impulse track is given a natural frequency, which is equal or nearly equal to the frequency of the impulse track to be recorded, because in this case a maximum amplitude may be obtained with a very low voltage, a damping of the oscillating system not being required.

The method forming the subject of the application is particularly suitable when using unperforated sound bands and sound bands whose ends have an endless, simple, or crossed connection, and which are provided with several sound tracks merging into one another and running parallel to the edge of the band.

Referring to the accompanying drawing which shows one embodiment of the invention:

Fig. 1 is a diagrammatic view of a recording system;

Fig. 2 is an enlarged detail view of the sound and synchronizing records on the sound recording film, and Fig. 3 is a diagrammatic view of a reproduction system.

Referring to Fig. 1, A represents a motion picture film adapted for exposure to light through an optical system designated generally by reference character 10.

Film A is fed through the camera by sprockets 12 and 13 from a motor 14 through suitable gearing 15 and a control box 16. Shaft 18 which carries the sprocket 12 serves to operate a generator for alternating or otherwise periodically varying current which actuates a recorder 20 for cutting a synchronizing groove 21 on the sound film B.

In using the groove 21 in synchronizing the motions of the film in exhibiting the picture I may employ an electromagnetic pick-up 30 as shown in Fig. 3 the current from which may be amplified and employed periodically to energize a magnet 32 and serves to release a yoke catch 34 from the studs 35 of a locking disk 36. Motor 40 rotates the film switching sprockets through a half turn whenever the disk 36 is freed by disengagement of the yoke from one of the studs 35.

The alternating current generator may be arranged to produce substantially the greatest slope of the curve 21 at the moment one picture frame is switched to the next.

What is claimed, is:

Apparatus for synchronizing the picture and the sound of picture-film and needle-sound-film devices arranged independently of each other, in which the sound record film has a mechanical track of synchronizing impulse records thereon in predetermined relation to the sound records thereof, comprising a reproducer for the sound record on the sound film, means including a needle engaged with said mechanical track for scanning the same during sound reproduction and also including a yielding support for said needle having a natural periodicity of vibration essentially identical to the frequency of the synchronizing impulses during sound reproduction, a reproducer for the picture film including a device for switching the said film from frame to frame, and means controlled by the scanning means for regulating the rate of switching in the picture reproducer.

HUGO WESTERKAMP.